(12) United States Patent
Klein et al.

(10) Patent No.: US 11,867,524 B2
(45) Date of Patent: Jan. 9, 2024

(54) AUTOMATIC PREDICTION OF VISITATIONS TO SPECIFIED POINTS OF INTEREST

(71) Applicant: VOLTA CHARGING, LLC, San Francisco, CA (US)

(72) Inventors: David J. Klein, Los Altos, CA (US); Ionel-Alexandru Hosu, Bucharest (RO); Silas M. Toms, San Francisco, CA (US)

(73) Assignee: VOLTA CHARGING, LLC, San Francisco, CA (US)

( * ) Notice: Subject to any disclaimer, the term of this patent is extended or adjusted under 35 U.S.C. 154(b) by 0 days.

(21) Appl. No.: 17/822,103

(22) Filed: Aug. 24, 2022

(65) Prior Publication Data

US 2023/0043023 A1 Feb. 9, 2023

Related U.S. Application Data

(63) Continuation of application No. 17/880,538, filed on Aug. 3, 2022.
(Continued)

(51) Int. Cl.
*G01C 21/36* (2006.01)
*H04W 4/021* (2018.01)
*G06N 5/022* (2023.01)

(52) U.S. Cl.
CPC ......... *G01C 21/3679* (2013.01); *G06N 5/022* (2013.01); *H04W 4/022* (2013.01)

(58) Field of Classification Search
CPC ............... G01C 21/3679; H04W 4/022
See application file for complete search history.

(56) References Cited

U.S. PATENT DOCUMENTS

2011/0204847 A1   8/2011   Turner
2016/0300170 A1 * 10/2016   Sun .................. G06Q 10/06315
(Continued)

FOREIGN PATENT DOCUMENTS

DE   102013202059 A1 *  8/2013   .............. B60L 53/14

OTHER PUBLICATIONS

The International Searching Authority, "Search Report" in Application No. PCT/US2022/39325, dated Nov. 2, 2022, 26 pages.
(Continued)

*Primary Examiner* — Peter D Nolan
*Assistant Examiner* — Demetra R Smith-Stewart
(74) *Attorney, Agent, or Firm* — Hickman Becker Bingham Ledesma LLP (57) ABSTRACT

Techniques are described herein for predicting popularity metrics and/or visitation metrics that are used in the selection of a point of interest (POI) for placement of an electric vehicle charging station (EVCS). The techniques involve training a machine learning model based on information obtained about POIs at which EVCSs are already installed. The information used to train the machine learning model includes, for each existing installation location: (a) visitation data that describes visitation features, and (b) popularity metrics and/or visitation metrics that have been generated for the location. When the machine learning model has been trained, the trained machine learning model predicts popularity metrics and/or visitation metrics for a POI location at which no EVCS has been installed based on the visitation data of that POI.

14 Claims, 3 Drawing Sheets

Related U.S. Application Data

(60) Provisional application No. 63/229,002, filed on Aug. 3, 2021.

(56) References Cited

U.S. PATENT DOCUMENTS

| | | |
|---|---|---|
| 2018/0340787 A1 | 11/2018 | Sheth |
| 2020/0213805 A1 | 7/2020 | Liang |
| 2021/0048302 A1* | 2/2021 | Maeda ............... B60L 58/12 |
| 2022/0082405 A1* | 3/2022 | Sumner ............. G01C 21/3682 |

OTHER PUBLICATIONS

Straka et al., "Predicting Popularity of EV Charging Infrastructure from GIS Data", ARXIV.org, arXiv:1910.02498v1, dated Oct. 6, 2019, 47 pages.

Current Claims in Application No. PCT/US2022/39325, dated Nov. 2022, 6 pages.

* cited by examiner

AUTOMATIC PREDICTION OF VISITATIONS TO SPECIFIED POINTS OF INTEREST

BENEFIT CLAIM

This application claims the benefit under 35 U.S.C. § 120 as a continuation of application Ser. No. 17/880,538 filed Aug. 3, 2022, which claims the benefit under 35 U.S.C. § 119(e) of provisional application 63/229,002, filed Aug. 3, 2021, by David J. Klein et al., the entire contents of which is hereby incorporated by reference. The applicant hereby rescinds any disclaimer of claim scope in the parent applications or the prosecution history thereof and advise the USPTO that the claims in this application may be broader than any claim in the parent application.

FIELD OF THE INVENTION

The present invention relates to automated prediction mechanisms and, more specifically, to automated prediction of popularity and visitation metrics for locations at which no electronic vehicle charging stations currently exist.

BACKGROUND

Various services collect and make available data about points of interest (POIs). These services may collect and provide numerous pieces of data for each of millions of POIs.

Such data is largely based on anonymized location data from mobile phones and cars. However, this data only provides a statistical sampling of the true visitors and can have a large discrepancy with the actual visitation for some POIs. Furthermore, some POIs may have data missing altogether. This is certainly true for POIs at which attractions (e.g. stores, charging stations, etc.) have not yet been built, which do not yet have any metrics available relating to popularity or visitation.

Even further, when certain actions/changes occur at a POI, the specific actions/changes may attract more visitors to the POI. Modeling this "lift" in visitation is an important capability for determining whether certain actions/changes should be taken at POIs. Thus, techniques are desired to accurately predict the visitation profile and visitation lift for a large variety of POIs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for predicting popularity metrics and/or visitation metrics that are used in the selection of a POI for placement of an electric vehicle charging station (EVCS). The techniques involve training a machine learning model based on information obtained about POIs at which EVCSs are already installed. The information used to train the machine learning model includes, for each existing installation location: (a) visitation data that describes visitation features, and (b) popularity metrics and/or visitation metrics, including visit durations, that have been generated for the location.

When the machine learning model has been trained, the trained machine learning model predicts popularity metrics and/or visitation metrics for a POI location at which no EVCS has been installed.

Additionally, placing EVCSs at a POI itself may alter the visitation to the POI. Increased visitations due to a change at a POI is referred to herein as "visitation lift". Techniques are provided herein for calculating visitation lift that would result from EVCS placement, and using visitation lift as a basis for selecting a POI for EVCS placement.

System Overview

Figure 1:
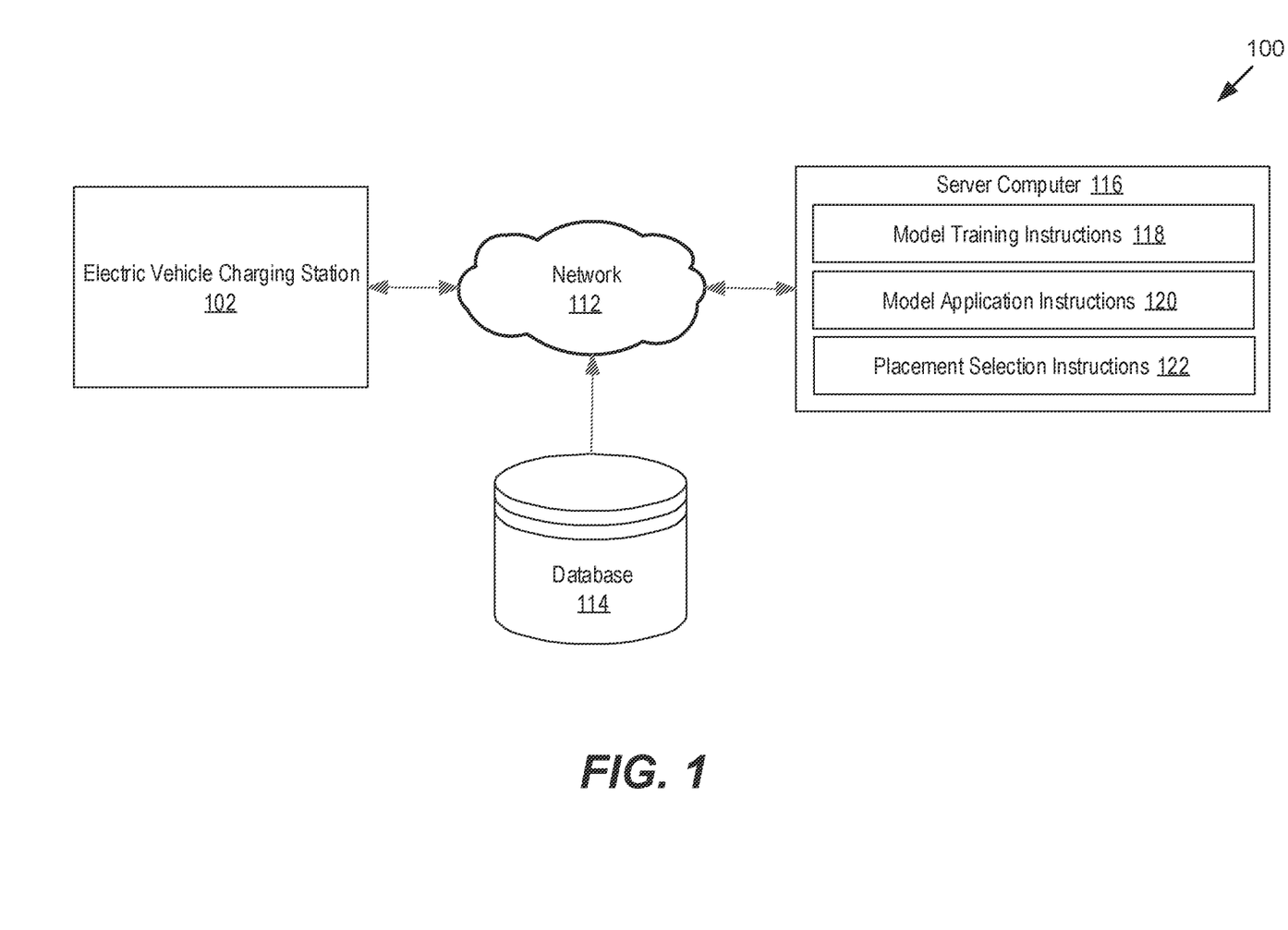
FIG. 1 is a block diagram illustrating an example networked computer system with which various implementations may be practiced.

FIG. 1 illustrates an example networked computer system with which various implementations may be practiced. FIG. 1 is shown in simplified, schematic format for purposes of illustrating a clear example and other implementations may include more, fewer, or different elements. System 100 comprises various entities and devices which may be used to practice an implementation. Network 112 is a network entity which facilitates communication between entities depicted in FIG. 1. Connection to network 112 is shown by double-sided arrows between a connecting entity and network 112. Network 112 may be any electronic communication medium or hub which facilitates communications between two or more entities, including but not limited to an internet, an intranet, a local area connection, a cloud-based connection, a wireless connection, a radio connection, a physical electronic bus, or any other medium over which digital and electronic information may be sent and received.

Server computer 116 is connected to network 116 and is an entity which facilitates the training of machine learning models, the application of trained machine learning models, and the selection of placements of EVCSs. Server computer 116 may be any hardware, software, virtual machine, or general-purpose entity capable of performing the processes discussed herein. In various implementations, the server computer 116 executes model training instructions 118, model application instructions 120, and placement selection instructions 122, the functions of which are described in other sections herein. The server computer 116 may also execute additional code, such as code for calculating visitation lift metrics and generating and transmitting requests to EVCS 102 and database 114.

The model training instructions 118 are instructions for training machine learning models. For example, the model training instructions 118 may include instructions to access information such as training data from the database 114. The model training instructions 118 may also include instruction to access external data sources and transmit or receive data to and from the model application instructions 120. Once the models are trained, the model training instructions 118 may be executed to store the trained machine learning models in database 114. The model training instructions 118 may also be executed to implement aspects of the flow diagrams that are further described herein.

The model application instructions 120 may include instructions to apply trained machine learning models on one or more inputs to generate one or more outputs. For example, the model application instructions 120 may include instructions for accessing information such as trained machine learning models from the database 114 and receiving one or more inputs to apply against such trained machine learning models to generate one or more outputs such as popularity metrics and/or visitation metrics. The model application instructions 120 may also include instruction to access external data sources to retrieve trained machine learning models and transmit or receive data to and from the model training instructions 120 and placement selection instructions 122. The model training instructions 118 may also be executed to implement aspects of the flow diagrams that are further described herein.

The placement selection instructions 122 include instructions for selectin points of interest for placement of EVCSs based on the one or more outputs satisfying one or more criteria. The placement selection instructions 122 may evaluate the one or more outputs of the trained machine learning models against one or more criteria or rules. For example, the one or more criteria may specify threshold values that, when satisfied by the one or more outputs, select a particular point of interest for placement of an EVCS. The placement selection instructions 122 may also be executed to access external data sources and transmit or receive data to and from the process that is executing the model application instructions 120. The placement selection instructions 122 may also be used for implementing aspects of the flow diagrams that are further described herein.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server computer 116.

Electric vehicle charging station (EVCS) 102 is a device/entity at a point of interest such as a geographical location which facilitates charging of an electric vehicle. EVCS 102 may comprise various programs, modules, or software applications, including an operating system and software application 104. The EVCS 102 may receive actions comprising instructions, requests, notifications, and/or recommendations to execute or display from server computer 116.

Database 112 may be any number of individual or linked storage devices or mediums which allow the storage of digital data related to the training dataset. For example, database 112 may store a training dataset that includes data records where each data record represents a specific POI and includes corresponding visitation data for the specific POI, popularity metrics for the specific POI, and visitation metrics for the specific POI.

Training Data Overview

A training dataset may include visitation data, popularity metrics, and visitation metrics. The training dataset may be used by model training instructions 118 to train one or more machine learning models, as further discussed herein.

Visitation data includes attributes and attribute values that are specific to POIs and may include at least one or more of the following attributes and corresponding attribute values: a) a category identifier of a POI such a, for example a NAICS or brand type, b) a population density surrounding a POI as a function of distance, for example, a popularity density within 10 miles of a POI, (c) demographic attributes as average values as a function of distance such as: an average income, an average age, an average number of children, an average number of housing units in each structure, a race, an occupation, an average number of vehicles, a commute distance, a road classification of a nearest road and/or distances to a nearest road for each member of a set of classifications including standard DOT classification such as: freeway, major arterial, minor arterial, collector, local collector, and local street, (d) a binary classification signifying whether a POI fronts more than one road, (e) a size of a POI such as any feature describing a number of independent stores at the POI, a square footage of a POI, or anything else indicating relative capacity for visitation, (f) an age of a POI, (g) a sale price of a POI, (h) a construction cost of a POI, (i) a number of other POIs of the same category of a POI within a radius, and (j) traffic data for nearby roads, which may include hourly traffic rates. Besides being associated with specific POIs, the attributes and attribute values may also be provided as an aggregated distribution over arbitrary two-dimensional or three-dimensional regions, thereby allowing the attributes to be visualized as a heatmap using 2D or 3D maps, for example.

Popularity metrics indicate popularity of specific POIs and include values that are specific to POIs. In one embodiment, popularity metrics comprise a percentage of visit count per multiple segments of a time frame for a POI. In one example, popularity metrics indicate a percentage of visit count to a POI per each hour of a day.

Visitation metrics indicate, for example, visit duration metrics of specific POIs and include values that are specific to POIs. In one embodiment, visit duration metrics comprise a percentage of visit count where a visit duration falls between non-overlapping bounds for a POI. In one example, visit duration metrics indicate a percentage of visit count to a POI where the visit duration falls between specified non-overlapping bounds (for example 0-5 minutes, 6-15 minutes, 15-30 minutes, 30-60 minutes, and 60-120 minutes).

Visitation metrics may also include visitation distributions, such as hourly distributions for an average day, a specific weekday (e.g. Monday, or weekday vs weekend), a specific calendar period (e.g. summer holiday or winter holiday), or according to other criteria. Visitation metrics may also include statistical analysis on visitation data including means, medians, deviations, and other calculations. These visitation metrics may be used to estimate electrical load over time at POIs, which may be useful data for municipalities and electrical utilities seeking to load balance electrical demand, and for business owners seeking to optimize electrical usage during off-peak hours when energy costs are lower. For example, business owners may provide time-of-day discounts to encourage drivers to charge during off-peak hours.

Besides visit density (number of visits over time) and visit duration metrics, visitation metrics may also indicate fine grained demographic profiles of the visitors to the POIs. As discussed above, the visitation metrics may include broadly defined demographic attributes defined as average values as a function of distance from POIs. In addition, the visitation metrics may include detailed demographic profiles of the actual or estimated visitors to a specific POI. The demographic profiles may be organized according to home and work block groups and may be built using information derived from credit bureaus, customer rewards programs, mobile applications, or other private and public data stores. These specific profiles may include large numbers of attributes, which may be distilled down into more manageable categories or generalized profiles. The demographic profiles may also be used for calculating visitation lift.

Based on the demographic profiles, customer behavior can be modeled to determine, for example, charging behavior or media consumption patterns, which can then be used to further tailor the configuration of charging stations or media screens to be installed at a POI. For example, if a POI is near a veterinarian office, then the demographic profiles for visitors of that POI may tend to indicate a higher percentage of pet owners, which indicates that advertising for pet related products and services may be especially effective for the POI. Thus, the demographic profiles can be used to determine advertising campaigns for media screens installed at the POI, as an example. In another example, demographic profiles may indicate that customers near a POI tend to own extended range EVs and prefer to use high speed charging stations when available. This can be used to plan for the mix of charging stations to be installed at a POI, for example by prioritizing a larger percentage of fast charging stations.

The training dataset may be organized into data records where each data record represents a specific POI and includes corresponding visitation data for the specific POI, popularity metrics for the specific POI, and visitation metrics for the specific POI.

The term "point of interest" as used in this application encompasses not only a specific point (e.g. a coordinate pair such as a latitude and longitude), but also larger regions, areas, or zones, which may, for example, correspond to a census block, a city or county, a geometric shape, or any defined area, which may also include multiple POIs. Thus, the term "point of interest" or "POI" also encompasses "regions of interest" or "areas of interest" that may include multiple "POIs". Popularity or visitation lift estimates for such regions may apply to all POIs within the region in aggregate.

Training

During the training phase, one or more machine learning models are trained using the training dataset by the model training instructions 118 to predict popularity metrics and/or visitation metrics. Supervised learning is used to train multi-output linear or nonlinear regression models based on the training dataset. In some embodiments, the machine learning algorithm used to train the one or more machine learning models comprises a random forest algorithm. In other embodiments, the machine learning algorithm used to train the one or more machine learning models comprises a neural network.

The visitation data, including at least one attribute, is used as input to a machine learning model and either the popularity metrics or visitation metrics are used as output to the machine learning model.

In one embodiment, a single machine learning model is trained using the training dataset to predict at least one popularity metric. In another embodiment, a single machine learning model is trained using the training dataset to predict at least one visitation metric.

In one embodiment, the training dataset may be segmented according to the category identifier attribute such that attributes of POIs with the same category are grouped together into a single dataset for training a single machine learning model that is specific to the respective category. For example, for a category identifier 'Retail Stores', all data records from the training dataset that include the 'Retail Stores' category identifier are combined into a category specific training dataset that can be used to train a machine learning model that is specific to the 'Retail Stores' category.

Use of Trained Models

Once the machine learning models are trained to predict popularity metrics and/or visitation metrics, the trained models can be used to predict popularity metrics and visitation metrics for POIs for which popularity metrics and visitation metrics are not currently available.

One or more inputs associated with a particular POI are provided as input to a trained machine learning model. In response to receiving the one or more inputs, the trained machine learning model generates at least one popularity metric and/or at least one visitation metric.

As a first example, the following inputs are provided to a trained machine learning model that is configured to predict at least one popularity metric: a road classification of a nearest road to the particular POI of 'freeway', distance to a nearest road from the particular POI of '0.2 miles', a population density surrounding the particular POI of '32.9'. In response, the trained machine learning model produces a set of popularity metrics comprising the values [10%, 15%, 25%, 30%, 15%, 5%]. Each value of the set of popularity metrics represents a percentage of visit count per segments of a 24 hour time frame for the particular POI. In this example, the 24 hour time frame is broken up into six four-hour segments. Thus, 10% of the visitors for the 24 hour time frame at the particular POI occur within the first four hours, 25% of the visitors for the 24 hour time frame at the particular POI occur within the second four hours, and so forth.

As a second example, the following inputs are provided to a trained machine learning model that is configured to predict at least one visitation metric: a road classification of a nearest road to the particular POI of 'local street', distance to a nearest road from the particular POI of '2 miles', a population density surrounding the particular POI of '20.2'. In response, the trained machine learning model produces a set of visit duration metrics comprising the values [10%, 30%, 25%, 30%, 5%]. Each value of the set of duration metrics represents a percentage of visit count where the visit duration falls between specified non-overlapping bounds for the particular POI. In this example, the specificized non-overlapping bound are as follows: 0-5 minutes, 6-15 minutes, 15-30 minutes, 30-60 minutes, and 60-120 minutes.

Thus, 10% of the visitors at the particular POI visit for 0-5 minutes, 30% of the visitors at the particular POI visit for 6-15 minutes, and so forth.

Once the popularity metrics and/or visitation metrics for a particular POI are determined, the popularity metrics and/or visitation metrics can be evaluated against one or more criteria or rules to determine whether one or more actions should be executed.

In one embodiment, if the popularity metrics and/or visitation metrics for a particular POI satisfy one or more criteria or rules, the particular POI is selected by the placement selection instructions 122 for placement of an EVCS. For example, the one or more criteria may specify threshold values that, when satisfied by popularity metrics and/or visitation metrics, select the particular point of interest for placement of an EVCS.

In another embodiment, in the case where an EVCS already exists at a particular POI, the popularity metrics and/or visitation metrics for the particular POI can be used as a basis for controlling the functionality of the EVCS at the particular POI. In one example, if the popularity metrics and/or visitation metrics for a particular POI satisfy one or more criteria or rules, server computer 116 may transmit a request to EVCS 102 to modify or set the pricing of electricity at the EVCS 102. In another example, if the popularity metrics and/or visitation metrics for a particular POI satisfy one or more criteria or rules, server computer 116 may transit a request to EVCS 102 to modify or set the pricing of electricity at the EVCS 102.

In another example, if the popularity metrics and/or visitation metrics for a particular POI satisfy one or more criteria or rules, server computer 116 may transmit a request to EVCS 102 that specifies charging optimization instructions that, when executed by the EVCS 102, optimize the amount of power being delivered to vehicles when charging at the EVCS 102. For example, the popularity metrics and/or visitation metrics may be evaluated to determine a specific time frame where a threshold amount of vehicles will be charging at a particular POI. Charging optimization instructions can be generated by the server computer 116 that specify how to deliver charge to the vehicles over the specific time frame. Such instructions are important because they can impact how the EVCS draws power from the power source and extend the longevity of electrical equipment associated with the EVCS by being optimized to deliver as little power over as long a period of time as possible, thereby avoiding high loads on the EVCS electrical equipment.

Visitation Lift

Using techniques discussed herein, the visitation metrics of a POI may be predicted, for the purpose of proposing EVCS placement. Additionally, placing EVCSs at a POI itself may alter the visitation lift of the POI.

Specifically, there are cases for which an EVCS may attract new visitors to a POI once the EVCS is placed at the POI. Modeling visitation lift is an important capability for determining whether EVCS placement may increase the business and/or use of an EVCS at a POI. This knowledge is important for the POI owner in deciding to host EVCSs. There are additional reasons why modeling lift in visitation is valuable, for example in quantifying the electrical grid impact, or in planning the number of EVCSs needed in an area, or in planning the position or location of EVCSs to be placed, such as where to place EVCSs along a traffic corridor or within a region.

Visitation lift may be calculated based on a series of calculations with actual data and/or predictions. Thus, visitation lift may be calculated for POIs using actual visitation metrics or estimated using predicted visitation metrics when actual data is unavailable. First, for a specific POI, an essential population of electric vehicle drivers in a same category as the specific POI is determined or received for an area around the specific POI. An essential population of electric vehicle drivers typically rely on public charging, as opposed to charging in their own homes, periodically for their EV charging needs. These drivers intend to visit a POI for some reason aside from charging but may choose a POI to visit partially on the basis of the presence of an EVCS. The essential population may be received from external sources and stored in database 114.

Second, one or more charging recommendations are generated for the area around the specific POI based on the essential population of electric vehicle drivers determined in step 1. Each charging recommendation may include a recommendation for an amount of one or more charger types for the specified area. For example, a charging recommendation may indicate that the area around the specific POI can support 10 fast chargers and 20 slow chargers. Charging recommendations be received from external sources and stored in database 114. The charging recommendation may be determined by server computer 16 or may be determined by an external source and received by server computer 116.

Third, a deficiency value is calculated for each charger type. A deficiency value for a charger type is calculated by comparing an amount of a recommended charger type for an area to an amount of actual charger types in the area. For example, if a charging recommendation indicates that the area around the specific POI can handle 10 fast chargers and the area around the specific POI currently has 5 fast chargers, a deficiency value of 50% is calculated for the fast charger type in the area, indicating that 50% of the essential population of electric vehicle drivers in a same category as the specific POI are not being served. Additionally, a served value for a charger type is calculated by comparing an amount of a recommended charger type for an area to an amount of actual charger types in the area. For example, if a charging recommendation indicates that the area around the specific POI can handle 10 fast chargers and the area around the specific POI currently has 5 fast chargers, a server value of 50% is calculated for the fast charger type in the area, indicating that 50% of the essential population of electric vehicle drivers in a same category as the specific POI are being served.

Fourth, the deficiency value is multiplied by: the essential population of electric vehicle drivers in a same category as the specific POI and a first attract rate constant. The first attract rate constant is a constant value that is tuned to match lift observations and may be any applicable value. The result of the calculation is a first partial visitation lift value that indicates a population of people that are not served. Additionally, the served value is multiplied by: the essential population of electric vehicle drivers in a same category as the specific POI, a second attract rate constant, and an equation $((N+M)/(T+M)/(N/T))$ where N is a number of existing chargers at the specific POI of a specific charger type, M is a number of new chargers at the specific POI of the specific charger type, T is a total number of chargers in the area and category of the specific charger type. The second attract rate constant is a constant value that is distinct from the first attract rate constant and is tuned to match lift observations and may be any applicable value. The result of the calculation is a second partial visitation lift value that indicates a population of people that are served. In this manner, the effectiveness or "gravity" of existing EVCS infrastructure can be estimated, and areas that are good candidates for competing against existing EVCS infrastructure can be identified based on whether it is easy or difficult to attract higher visitation lift, or to pull away from the "gravity" of existing EVCS infrastructure.

Fifth, the population of people that are not served is summed with the population of people that are served. The result is a visitation lift value that indicates a lift in population for a specific charger type.

Once calculated, visitation lift values can be used in combination with predicted particular popularity metrics and/or visitation metrics to select one or more points of interest for placement of one or more EVCSs. For example, if a total visitation lift of a POI is above a threshold value and the popularity metrics and/or visitation metrics of a POI are above threshold values, then the POI is selected for placement of an EVCS. In this manner, the placement of EVCSs can be dynamically adjusted to satisfy various EV charging needs, as discussed above.

Besides identifying proposed locations of EVCS, the visitation lift can also be used generally to determine whether a proposed change to existing or proposed EVCS infrastructure results in a net positive outcome. For example, one proposed change may be to install media screens at EVCSs of proposed POIs. The visitation lift for the proposed POIs can be used to estimate an increase in advertising revenue, customer awareness, or other positive benefit, which may be weighed against the costs of screen installation and ongoing maintenance. Based on a cost analysis, a decision can be made whether to install the media screens at the proposed POIs. Similar cost analysis may be performed to determine, for example, customer rewards programs or other features at existing or proposed EVCS infrastructure.

Example Procedure

Figure 2:
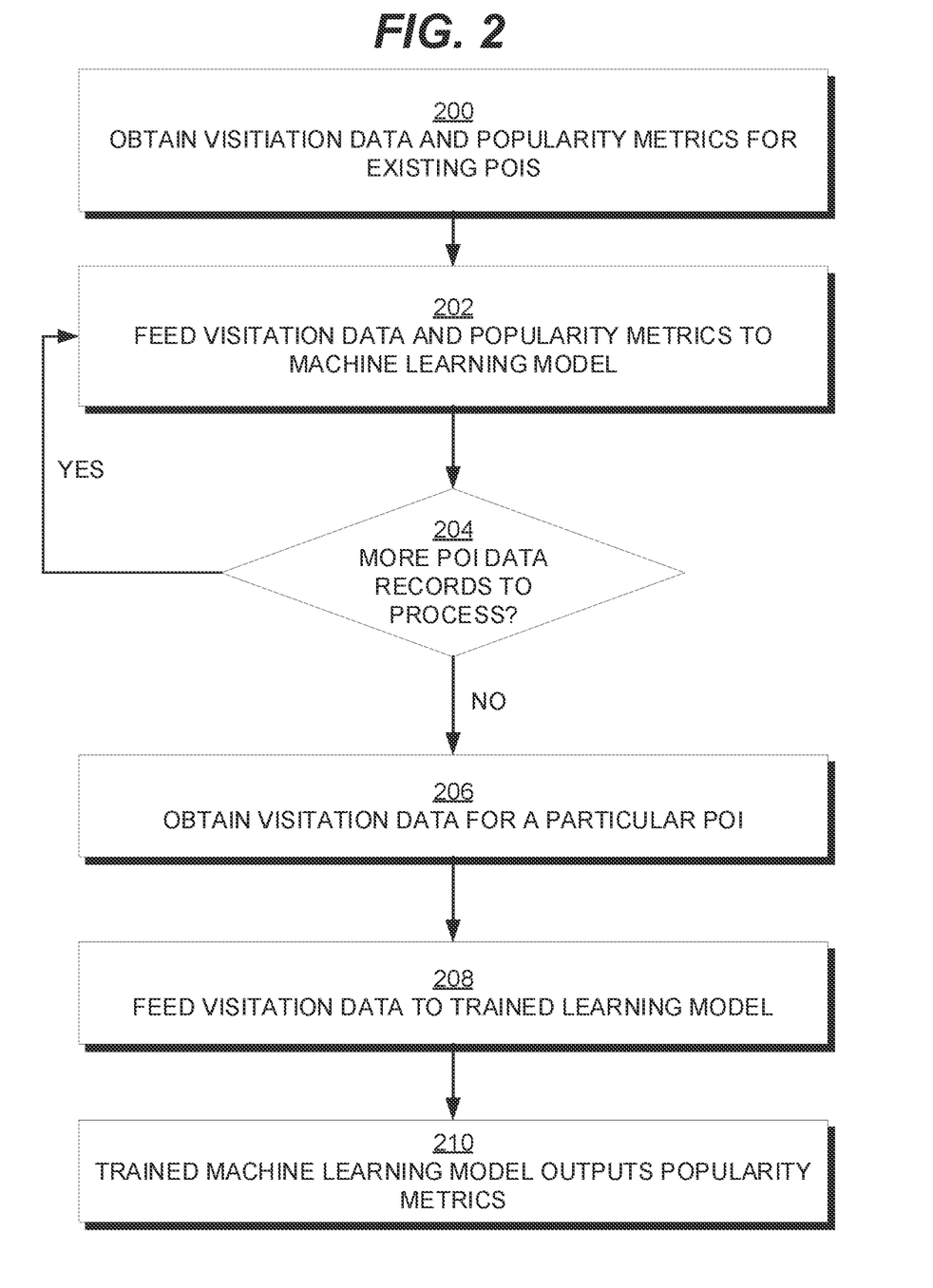
FIG. 2 is a flowchart illustrating steps for predicting popularity and/or visitation metrics for POIs, according to an embodiment.

Referring to FIG. 2, it is a flowchart illustrating the general steps for predicting popularity and/or visitation metrics for POIs, according to an embodiment.

At step 200, visitation data for one or more POIs for which popularity metrics are currently available and popularity metrics for the one or more POIs are obtained. The visitation data may be obtained from sources such as the US Census and other data service providers. The popularity metrics may be obtained from various data service providers.

At step 202, the visitation data for a particular POI and popularity metrics for the particular POI are fed into a machine learning model to train the model. Step 204 forms a loop, causing step 202 to be repeated for each POI of the one or more POIs included in the visitation data and the popularity metrics. After all data records from the training dataset have been processed in this manner, the machine learning engine is trained, and control passes to step 206.

At step 206, visitation data is obtained for a particular POI. The visitation data for the POI may be obtained from the same sources that were used to obtain the visitation data for the training dataset.

At step 208, the visitation data for the particular POI is fed to the trained machine learning model, causing the trained machine learning model to output a particular popularity metric prediction for the particular POI. The particular popularity metric prediction may be, for example, a percentage of visit count per multiple segments of a time frame for the particular point of interest.

The machine learning model may be retrained periodically to ensure the model produces the most accurate predictions possible. For example, steps 200-204 may be repeated in response to newly available census data, newly created POIs, new visitation data for existing POIs, and/or new popularity metrics for existing POIs.

In one embodiment, the popularity metrics used to train the machine learning model may be replaced by visitation metrics so that the trained machine learning model predicts visitation metrics for a particular POI.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
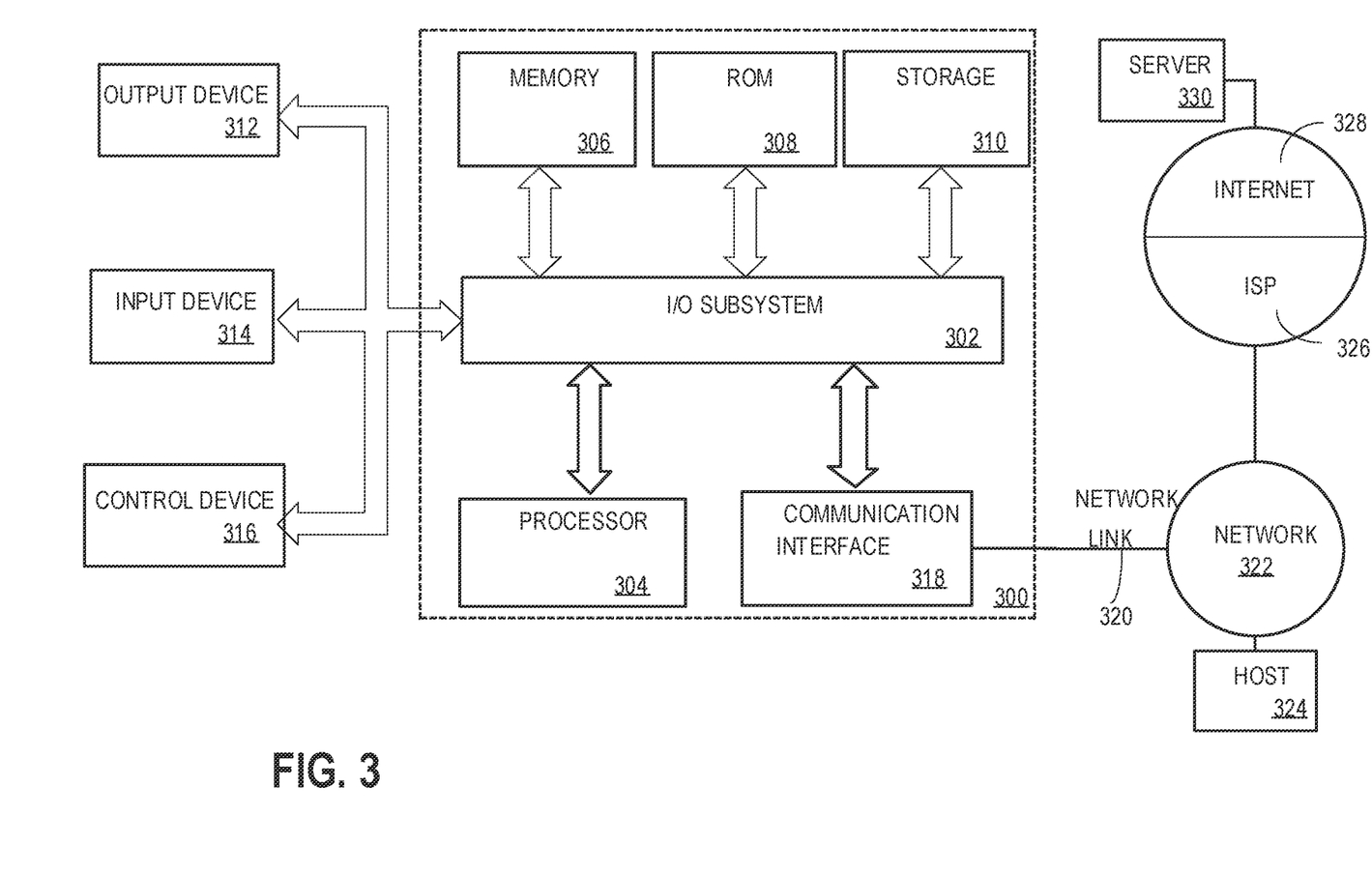
FIG. 3 is a block diagram of a computer system upon which the techniques described herein may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   training a machine learning model to predict at least one visitation metric that reflects visitation of points of interest (POIs) for which visitation metrics are not currently available;
   wherein training the machine learning model comprises training the machine learning model using a training dataset comprising:
      visitation data for one or more points of interest for which visitation metrics are currently available, and
      visitation metrics for the one or more points of interest;
   using the trained machine learning model, determining a particular visitation metric for a particular POI for which visitation metrics are not currently available based on one or more inputs associated with the particular POI;
   selecting the particular POI for placement of an electric vehicle charging station (EVCS) based, at least in part, on the particular visitation metric satisfying one or more criteria;
   calculating a deficiency value and a served value for a specific type of charger, wherein the deficiency value and the served value are calculated based on an essential population of electric vehicle drivers in a same category as the particular POI that exist in an area around the particular POI and one or more charging recommendations that indicate an amount of chargers of the specific type that the area around the particular POI can support;
   calculating a first partial visitation lift value based on the deficiency value;
   calculating a second partial visitation lift value based on the served value;
   calculating a total visitation lift value for the particular POI based on the first partial visitation lift value and the second partial visitation lift value;
   wherein selecting the particular POI for placement of an EVCS is additionally based on the total visitation lift value for the particular POI.

2. The method of claim 1, wherein the particular visitation metric comprises a percentage of visit count where a visit duration falls between non-overlapping bounds for the particular point of interest.

3. The method of claim 1, wherein the one or more inputs includes one or more of: a road classification of a nearest road, a population density in a surrounding area, and a number of other POIs of the same category as the particular POI within a vicinity.

4. The method of claim 1, furthering comprising:
   generating, based on the particular visitation metric, instructions that specify to deliver charge to electric vehicles over a specific time frame at a specific rate;
   transmitting the instructions to the EVCS to cause the EVCS to deliver charge to electric vehicles over the specific time frame at the specific rate.

5. The method of claim 1, wherein the visitation metrics for the one or more points of interest include demographic profiles of visitors to the one or more points of interest.

6. The method of claim 1, wherein the visitation metrics include visitation distributions over time for the one or more points of interest.

7. The method of claim 1, further comprising: determining whether a proposed change for the particular POI results in a net positive outcome based on the particular visitation metric determined for the particular POI for which visitation metrics are not currently available.

8. A system comprising:
   one or more processors;
   one or more storage devices operatively coupled to the processor;
   instructions, stored on the one or more storage devices, which, when executed by the one or more processors, cause:
      training a machine learning model to predict at least one visitation metric that reflects visitation of points of interest (POIs) for which visitation metrics are not currently available;
      wherein training the machine learning model comprises training the machine learning model using a training dataset comprising:
         visitation data for one or more points of interest for which visitation metrics are currently available, and
         visitation metrics for the one or more points of interest;
      using the trained machine learning model, determining a particular visitation metric for a particular POI for which visitation metrics are not currently available based on one or more inputs associated with the particular POI;
      selecting the particular POI for placement of an electric vehicle charging station (EVCS) based, at least in part, on the particular visitation metric satisfying one or more criteria;
      calculating a deficiency value and a served value for a specific type of charger, wherein the deficiency value and the served value are calculated based on an essential population of electric vehicle drivers in a same category as the particular POI that exist in an area around the particular POI and one or more charging recommendations that indicate an amount of chargers of the specific type that the area around the particular POI can support;
      calculating a first partial visitation lift value based on the deficiency value;
      calculating a second partial visitation lift value based on the served value;
      calculating a total visitation lift value for the particular POI based on the first partial visitation lift value and the second partial visitation lift value;
      wherein selecting the particular POI for placement of an EVCS is additionally based on the total visitation lift value for the particular POI.

9. The system of claim 8, wherein the particular visitation metric comprises a percentage of visit count where a visit duration falls between non-overlapping bounds for the particular point of interest.

10. The system of claim 8, wherein the one or more inputs includes one or more of: a road classification of a nearest road, a population density in a surrounding area, and a number of other POIs of the same category as the particular POI within a vicinity.

11. The system of claim 8, wherein the instructions further comprise instructions for: generating, based on the particular visitation metric, instructions that specify to deliver charge to electric vehicles over a specific time frame at a specific rate;

transmitting the instructions to the EVCS to cause the EVCS to deliver charge to electric vehicles over the specific time frame at the specific rate.

12. The system of claim 8, wherein the visitation metrics for the one or more points of interest include demographic profiles of visitors to the one or more points of interest.

13. The system of claim 8, wherein the visitation metrics include visitation distributions over time for the one or more points of interest.

14. The system of claim 8, further comprising: determining whether a proposed change for the particular POI results in a net positive outcome based on the particular visitation metric.

* * * * *